United States Patent [19]
Farrington et al.

[11] Patent Number: 6,034,513
[45] Date of Patent: *Mar. 7, 2000

[54] SYSTEM AND METHOD FOR CONTROLLING POWER FACTOR AND POWER CONVERTER EMPLOYING THE SAME

[75] Inventors: Richard William Farrington, Heath; Mark Elliott Jacobs; Hengchun Mao, both of Dallas, all of Tex.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,429

[22] Filed: Apr. 2, 1997

[51] Int. Cl.[7] .............................. G05F 1/70; G05F 1/614
[52] U.S. Cl. ........................... 323/222; 323/285; 323/288
[58] Field of Search ..................... 323/222, 224, 323/282, 283, 284, 285, 288; 363/15, 16, 34, 39

[56] References Cited

U.S. PATENT DOCUMENTS

| | | | |
|---|---|---|---|
| 4,677,366 | 6/1987 | Wilkinson et al. | 323/222 |
| 4,683,529 | 7/1987 | Bucher, II | 363/44 |
| 4,837,495 | 6/1989 | Zansky | 323/222 |
| 5,391,976 | 2/1995 | Farrington et al. | 323/207 |
| 5,457,620 | 10/1995 | Dromgoole | 363/21 |
| 5,490,055 | 2/1996 | Boylan et al. | 323/285 |
| 5,742,151 | 4/1998 | Hwang | 323/222 |

OTHER PUBLICATIONS

Dragan Maksimovic, Yungtaek Jang, and Robert Erickson, NonLinear–Carrier Control for High Power Factor Boost Rectifiers. 1995 IEEE APEC(pp. 635–641).

Jay Rajagopalan, Fred C. Lee and Paolo Nora, A Generalized Technique for Derivation of Linear Average Current Mode Control Laws for Power Factor Correction without Input Voltage Sensing. VPEC SeminarProceedings—September 19–21, 1996, (pp. 23–28).

Joel P. Gegner and C.Q. Lee, Linear Peak Current Mode Control: A Simple Active Power Factor Correction Control Technique for Continuous Conduction Mode. Proceedings of PESC 1996, (pp. 196–202).

Jeffrey Hwang, Alland Chee and Wing–Hung Ki, New Universal Control Methods for Power Correction and DC to DC Converter Applications, IEEE APEC 1997 (pp. 59–65).

"A General Constant Frequency Pulse–Width Modulator and Its Applications" by Zheren Lai and Keyue M. Smedley; Sep. 1996; pp. 279 –290.

"A Family of Power–Factor–Correction Controllers" by Zheren Lai and Keyue M. Smedley; 1997; pp. 66–73.

Primary Examiner—Y. J. Han

[57] ABSTRACT

A power factor controller, a method of controlling power factor and a power converter employing either the controller or the method. The controller includes: (1) a ramp circuit that senses an output voltage of a converter being controlled and generates an intermediate waveform that rises as a function of a magnitude of the output voltage and (2) a drive circuit, coupled to the ramp circuit, that senses a current in the converter and causes the intermediate waveform to fall at a time that is a function of a magnitude of the current, the drive circuit generating a drive signal for the converter from the intermediate waveform.

22 Claims, 11 Drawing Sheets

INPUT CURRENT WAVEFORM

CURRENT SPECTRUM

INPUT CURRENT WAVEFORM

CURRENT SPECTRUM

INPUT CURRENT WAVEFORM

CURRENT SPECTRUM

INPUT CURRENT WAVEFORM

CURRENT SPECTRUM

INPUT CURRENT WAVEFORM

CURRENT SPECTRUM

INPUT CURRENT WAVEFORM

CURRENT SPECTRUM

SYSTEM AND METHOD FOR CONTROLLING POWER FACTOR AND POWER CONVERTER EMPLOYING THE SAME

TECHNICAL FIELD OF THE INVENTION

The present invention is directed, in general, to power conversion and, more specifically, to a system and method for controlling the power factor of a controllable power converter and a power converter employing the system or the method.

BACKGROUND OF THE INVENTION

Substantial effort has been expended over the past decade to design control processes for switching power supply topologies that provide near-perfect power factor. The objective is to generate minimum waveform distortion of the input AC line voltage, and to feed back to the AC source a minimum of harmonics that are multiples of the AC line frequency.

An important early approach to this problem, disclosed by Willinson, et al. in U.S. Pat. No. 4,677,366 (Issued: Jun. 30, 1987), is to use a slow DC output voltage feedback loop (with a typical 5–15 Hz crossover frequency), combined with a fast average current loop (typically 7–10 kHz), to shape the input current waveform so that it follows the waveform of the AC line voltage. This process requires a multiply-and-divide operation in silicon, usually implemented as a "Gilbert multiplier," with its attendant intricacies and cost, as well as a means to sense the AC line voltage. An improvement to this control process, described by Farrington, et al., in U.S. Pat. No. 5,391,976 (Issued: Feb. 21, 1995), uses output power feed-forward to eliminate the principal effects of a slow output voltage loop, but a multiply-and-divide operation and AC line-sensing are still required.

U.S. Pat. No. 4,683,529, issued to Bucher on Jul. 28, 1987, describes an alternative to the foregoing approaches that avoids both the need for a multiply-and-divide operation and the need to sense the AC line voltage. The process described by Bucher operates a boost converter on the boundary between continuous and discontinuous conduction in the boost inductor (i.e., between continuous conduction mode "CCM" and discontinuous conduction mode "DCM"), which is detected and controlled by sensing the input voltage to the boost diode to determine the zeros of the inductor current. The result is more input ripple than is usually achieved with a typical CCM design, and variable switching frequency, both of which complicate achieving electromagnetic interference ("EMI") compliance. The process, however, does advantageously avoid boost diode reverse recovery because the boost diode current is essentially zero when the active switch is turned on.

Other low cost control alternatives that do not use the multiply-and-divide operation have been proposed which can provide power factor of about 96% or better with only modest harmonic distortion. An example is the 364A rectifier, designed at Bell Laboratories in the late 1980's, which uses a boost front end that is controlled by peak-current control with a compensating ramp that is periodic at the switching frequency. The combined control signal is compared with the output of a voltage error amplifier, which has a 6–8 Hz loop response, to terminate the switch duty cycle. The duty cycle is initiated by a clock signal. By properly selecting the slope of the compensating ramp, a power factor of 98–99% can be achieved over a modest operating range of AC input voltage and load, but performance deteriorates at light load where DCM conditions prevail.

An article entitled, "Nonlinear-Carrier Control for High Power Factor Boost Rectifiers," by Maksimovic (Proceedings of APEC 1995, pp. 635–641), describes the development of a control process which does not require a multiply-and-divide operation or AC line-sensing; a periodic waveform is used with a period of the switching frequency and which consists of a repeating parabolic curve (a "nonlinear carrier"). The waveform is compared with either the cycle-by-cycle integrated switch current or the peak switch current. The parameters of the parabolic waveform are controlled by the output voltage error amplifier. The switch duty cycle is initiated by a clock signal and is terminated when the switch current (average or peak) exceeds the repeating parabolic waveform. A key assumption in the author's derivation is that the boost inductor is in CCM, but the resulting input current waveform is "reasonably sinusoidal" for practical designs which necessarily include DCM near the zeros of the AC line voltage; thus, power factor performance degrades as the load current is reduced.

The foregoing control schemes assume CCM steady-state solutions without considering DCM operation, with the result that the input current distortion is increased at light load due to the DCM condition. In all of the foregoing schemes, both the sensed current signal and the control ramp are practically zero at light load, making the output of the controller extremely noise sensitive, and the converter very difficult to stabilize. The very low ramp slope at light load also increases the small-signal gain of the converter control loop, further complicating the control design.

In addition to the disadvantages of the above-described controllers, each converter topology requires a different controller design. Thus, it would be of value to unify the controller structures for all topologies so that the design complexity and cost of a PFC controller can be reduced.

Therefore, what is needed in the art is a simple, universal controller that can achieve high power factor and low current distortion in all operating conditions, including CCM and DCM.

SUMMARY OF THE INVENTION

To address the above-discussed deficiencies of the prior art, the present invention provides a power factor controller, a method of controlling power factor and a power converter employing either the controller or the method. The controller includes: (1) a ramp circuit that senses an output voltage of a converter being controlled and generates an intermediate waveform that rises as a function of a magnitude of the output voltage and (2) a drive circuit, coupled to the ramp circuit, that senses a current in the converter and causes the intermediate waveform to fall at a time that is a function of a magnitude of the current, the drive circuit generating a drive signal for the converter from the intermediate waveform.

The present invention therefore introduces the broad concept of providing a ramped intermediate waveform having a positive slope proportional to the variable output of the output voltage. This frees the intermediate waveform from having to reach a zero value at a given time and allows near unity power factor operation of a converter in discontinuous conduction mode ("DCM").

In one embodiment of the present invention, the ramp circuit comprises an error amplifier that compares the output voltage with a voltage reference. Those skilled in the art are familiar with the structure and operation of error amplifiers. The present invention makes advantageous use of an error amplifier to determine, at least in part, the rate of rise of the intermediate waveform.

In one embodiment of the present invention, the drive circuit comprises: (1) a clock, (2) a flip-flop coupled to the clock that generates the drive signal and (3) a controllable switch coupled to the ramp circuit that causes the intermediate waveform to fall. In an embodiment to be illustrated and described, the controllable switch short-circuits a capacitor in the ramp circuit, causing the intermediate waveform to fall.

In one embodiment of the present invention, the current represents one of the group consisting of (1) converter inductor current, (2) converter switch current and (3) converter diode current. The present invention most advantageously employs a generalized current, allowing the controller of the present invention to operate with a variety of converter topologies. In the Detailed Description to follow, several different circuits for providing this generalized current from specific locations in different converter topologies will be disclosed.

In one embodiment of the present invention, the ramp circuit comprises a voltage bias circuit that adjusts a rate of rise of the intermediate waveform. Of course, the voltage bias circuit is not necessary to the broad scope of the present invention.

In one embodiment of the present invention, the drive circuit comprises a current bias circuit that adjusts an occurrence of the duty-cycle start time. Likewise, the current bias circuit is not necessary to the broad scope of the present invention.

In one embodiment of the present invention, the drive circuit employs the drive signal to cause the intermediate waveform to fall. Alternatively, the drive circuit can employ a clock signal, derived directly from a clock, to cause the intermediate waveform to fall.

In one embodiment of the present invention, the converter is selected from the group consisting of: (1) a boost converter, (2) a buck-boost converter, (3) a flyback converter, (4) a sepic converter, (5) a Cuk converter and (6) a zeta converter. Those skilled in the art will recognize other converter topologies with which the present invention may be employed to advantage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
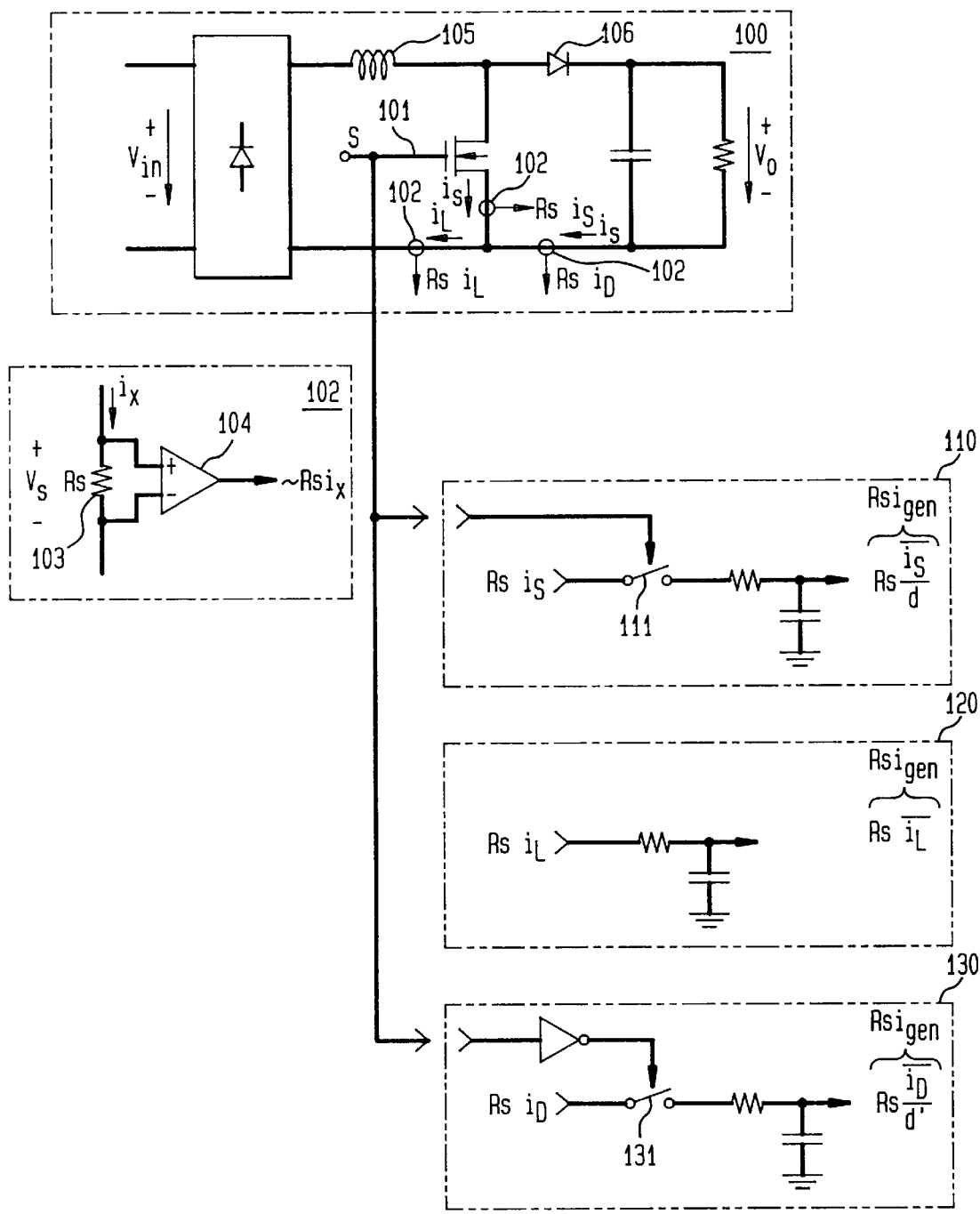
FIG. 1 illustrates exemplary circuits for producing "generalized" currents with a boost converter.

In addition to the control approaches described hereinabove, an article entitled "Linear Peak Current Mode Control: A Simple Active Power Factor Control Technique for Continuous Conduction Mode," by Gegner and Lee (Proceedings of PESC 1996, pp. 196–202), describes a simple periodic, linearly-decreasing waveform at the switching frequency that can be used to terminate the boost switch duty cycle in place of Maksimovic's periodically repeating parabola. Gegner and Lee observe that, by appropriate control of a linear periodic ramp in conjunction with peak current control, the peak inductor current becomes linearly proportional to the off duty cycle of the boost switch. The particular ramp requirement is that its negative slope be proportional to the output voltage error amplifier and also be zero at the end of each switching cycle. It is shown that, if this condition is satisfied, then the peak inductor current will be proportional to the rectifier input voltage, which is the approximating basis for high power factor and low input-current harmonic distortion. Following Maksimovic, Gegner and Lee also maintain the requirement for CCM. Gegner and Lee also start the boost switch duty cycle at a clock signal, and terminate it when the peak switch current exceeds the linear periodic waveform. Improved results, particularly at light load, are claimed if filtered switch current is used in the control process in place of instantaneous switch current.

An article entitled "A Generalized Technique for Derivation of Linear Average Current Mode Control Laws for Power Factor Correction without Input Voltage Sensing," by Rajagopalan (1996 VPEC Seminar Proceedings, Sep. 19–21, 1996, pp. 23–28), provides an alternative derivation of the conditions for high power factor without line voltage sense, etc.; Rajagopalan starts with average currents in various branches of the boost stage, assumes CCM, and derives a control process that is similar in structure to that described by Gegner and Lee, but which explicitly uses average circuit currents. The controller disclosed by Rajagoplan includes the logic to provide average circuit currents cycle-by-cycle (an "integrate and hold" scheme) for use in the comparison with an adjustable, periodic ramp that declines to zero at the end of each switching cycle. Rajagopalan also extends these results to a flyback topology (with its particular duty cycle vs. output voltage equation) and provides the necessary elements for the required high power factor control process.

The processes described by the prior two articles each contain a ramp repeating at the switching frequency with a slope proportional to the variable output of an operational amplifier. The initial amplitude of the ramp must be adjusted cycle by cycle so that the ramp value is zero at precisely the end of each switching cycle. A current in the boost topology, which may be a peak or average current of the switch or of the input current, or a filtered version of one of these currents, is compared with this ramp to detect termination of the duty cycle. In practical circuit implementations, however, the switching frequency is not accurately known because of part-to-part variations; and the ramp slope cannot be accurately set without the use of precision resistors and capacitors, which adds to the cost of the manufactured product. The result is the inability of the circuit to accurately provide a ramp which is zero at the end of the switching cycle, and this affects the accuracy of the rectifier to produce an input current which is reasonably sinusoidal and which contains a low level of harmonic distortion. If the ramp is not zero at the end of the switching cycle, then accurate duty cycles near unity are difficult to construct, which are required near the zero-crossings of the input AC waveform.

To overcome the deficiencies and disadvantages of control schemes disclosed hereinabove, an objective of the present invention is to provide a simple, universal controller that can provide high power-factor and low current-distortion under all operating conditions, including continuous conduction mode ("CCM") and discontinuous conduction mode ("DCM"). For all principal power-factor-correcting ("PFC") power supply topologies—namely boost, buck-boost, flyback, sepic, Cuk, and zeta converters—one of the basic design goals is to emulate a resistor at the input of the converter:

$$\overline{i_{in}} = \frac{\overline{v_{in}}}{R_{eq}} \tag{1}$$

where $i_{in}$ and $v_{in}$ are the input current and input voltage, respectively, and in which the bar represents the average parameter value over a switching cycle; and $R_{eq}$ is the equivalent controllable resistance of the PFC converter:

$$R_{eq} = \frac{V_{in}^2}{P_{in}} \tag{2}$$

where $V_{in}$, is the rms value of the AC input voltage, and $P_{in}$ is the input power. Those skilled in the art will recognize that, during steady-state operation of a PFC converter, the value of $R_{eq}$ is substantially constant.

For a boost rectifier, during steady-state CCM operation, the relationship between the input voltage and the output voltage is a function of the switch duty cycle d:

$$V_o = \frac{v_{in}}{1-d} \Rightarrow v_{in} = V_o(1-d) = V_o d' \tag{3}$$

where $V_o$ is the converter output voltage, and d' is the complementary duty-cycle (i. e., the diode duty cycle). Similarly, for buck-boost, flyback, sepic, Cuk and zeta converters, the relationship between the input voltage and the output voltage is also a function of the switch duty cycle d:

$$V_o = \frac{v_{in}d}{1-d} \Rightarrow v_{in} = V_o \frac{1-d}{d} = V_o \frac{d'}{d} \tag{4}$$

where $V_o$ is again the converter output voltage (reflected to the transformer primary in transformer-isolated topologies). In the following analysis, a current or voltage variable represents the value reflected to the transformer primary if there is an isolation transformer.

Combining (3) into (1), with straightforward manipulation, it can be seen that, for a boost rectifier:

$$\overline{i_{in}} = \frac{V_o}{R_{eq}} d' \tag{5}$$

and, as those skilled in the art will recognize for CCM:

$$\overline{i_{in}} = \overline{i_L} = \frac{i_S}{d} = \frac{i_D}{d'} \tag{6}$$

where $i_L$, $i_S$, and $i_D$ are, respectively, the boost inductor current, the switch current, and the diode current, and thus, for CCM:

$$\overline{i_L} = \frac{V_o}{R_{eq}} d' \tag{7}$$

$$\frac{\overline{i_S}}{d} = \frac{V_o}{R_{eq}} d' \tag{8}$$

-continued $$\frac{\overline{i_D}}{d'} = \frac{V_o}{R_{eq}} d' \quad (9)$$

Similarly, by combining (4) into (1), it can be seen that, for buck-boost, flyback, sepic, Cuk, and zeta converters:

$$\overline{i_{in}} d = \frac{V_o}{R_{eq}} d' \quad (10)$$

and, as those skilled in the art will recognize:

$$\overline{i_{in}} = \overline{i_S} = \overline{i_L} d = \frac{i_D d}{d'} \quad (11)$$

where $i_L$, for sepic, Cuk, and zeta rectifiers, is the sum of the currents in the two inductors. Thus:

$$\overline{i_L} d^2 = \frac{V_o}{R_{eq}} d' \quad (12)$$

$$\overline{i_S} d = \frac{V_o}{R_{eq}} d' \quad (13)$$

$$\frac{\overline{i_D} d^2}{d'} = \frac{V_o}{R_{eq}} d' \quad (14)$$

The equations (3) through (14) are each based on steady-state average values. Thus, if the control of the converter satisfies equations (7) through (9) for boost topologies, or equations (12) through (14) for the other principal topologies, the input current waveform will have substantially the same profile as the input voltage waveform. In practical PFC applications, this means nearly unity power factor and low total harmonic distortion ("THD") in CCM operation. To satisfy the foregoing equations exactly, however, is impossible, since it would require the determination of the average current in a switching cycle before that switching cycle ends, violating the principle of causality. Therefore, any practical implementation must be a causal approximation of these equations.

The present invention recognizes that the left side term in each of the equations (7), (8), (9) and (12), (13), (14) is a current measurement modulated by a duty cycle, defined herein as "generalized" currents, which can be determined by filtering or integrating arrangements described hereinafter. Additionally, it is recognized that the term $V_o/R_{eq}$ is constant during steady state operation and that it is proportional to both input and output conditions. Whereas $V_o/R_{eq}$ is proportional to the input power (reference equation (2) above), which affects the change of output voltage, it can be employed as the output of a voltage controller. Using a control strategy based on the foregoing principles, the present invention discloses a PFC controller system and method, employing the control principles of equations (7), (8), or (9), or equations (12), (13), or (14), which can be used for all principal PFC topologies; i.e., a "universal" controller.

The control signals for the universal controller disclosed by the present invention include a signal proportional to a generalized current $i_{gen}$ for the converter being controlled. Circuits for producing a signal proportional to a generalized current $i_{gen}$ can be implemented in different ways, based on the type of converter; the schemes disclosed herein employ principles similar to those proposed by Dromgoole in U.S. Pat. No. 5,457,620, which is commonly assigned with the present invention and which is incorporated herein by reference as if reproduced in its entirety. Referring initially to FIG. 1, illustrated are exemplary circuits 110, 120, and 130 for producing signals proportional to a generalized current $i_{gen}$, as defined hereinabove, with a boost converter 100; the universal PFC controller disclosed herein is suitably operative with any one of the alternative circuits 110, 120, 130.

Those skilled in the art will recognize the conventional topology of boost converter 100 having a switch 101, where $i_L$, $i_S$, and $i_D$ are, respectively, the boost inductor 105 current, the switch 101 current, and the diode 106 current. To produce a signal proportional to a desired current, a current sense circuit 102 is suitably located within the circuitry of converter 100 to generate the desired signal. In one embodiment, current sense circuit 102 includes a resistor 103 placed in series with a current $i_x$ to be sensed and, optionally, a differential amplifier 104 for sensing a voltage $V_s$ across resistor 103; an output of the differential amplifier 104 producing a signal $R_s i_x$ (x=S, L, or D) proportional to the magnitude of the current $i_x$ passing through resistor 103. Those skilled in the art will readily conceive of other suitable means for sensing a current, such as current transformers and Hall sensors; the principles of the present invention are not limited to a particular structure or method for sensing a current.

The output of current sense circuit 102 is coupled to an input of either exemplary circuit 110, 120, or 130 for producing a signal $R_s i_{gen}$ that is proportional to a generalized current $i_{gen}$; the signal produced by exemplary circuits 110, 120, and 130 being proportional to the generalized currents defined by equations (8), (7), and (9), respectively. The most straightforward implementation for boost rectifiers is to sense the inductor current using exemplary circuit 120. The typically continuous inductor current, however, excludes the use of a simple current transformer in the current sensing circuit, and can cause high power loss in a sensing resistor. Thus, in relatively high power applications, it is generally preferable to sense the diode or switch current.

If the diode or switch currents are used directly, peak mode current control is preferable since the average values of the diode and switch currents are different from the input current; to provide the preferable average current control, exemplary circuits 110 and 130 having signal-level switches 111 and 131, respectively, can be used to process the sensed diode or switch current. The function of the switches 111, 131 is to realize the left-side term of the equations (8) and (9), respectively. The two sensing schemes illustrated in exemplary circuits 110 and 130 allow the use of simple and efficient diode/switch current sensing schemes for average-current mode control, and improve the performance of PFC rectifiers. Those skilled in the art will readily perceive of other circuits, functionally equivalent to exemplary circuits 110, 120, and 130, for producing signals proportional to a generalized current $i_{gen}$ with a boost converter 100; the principles of the present invention are not limited to a particular choice of alternative circuits 110, 120, 130, or a specific circuit topology for producing a signal proportional to a generalized current.

Figure 2:
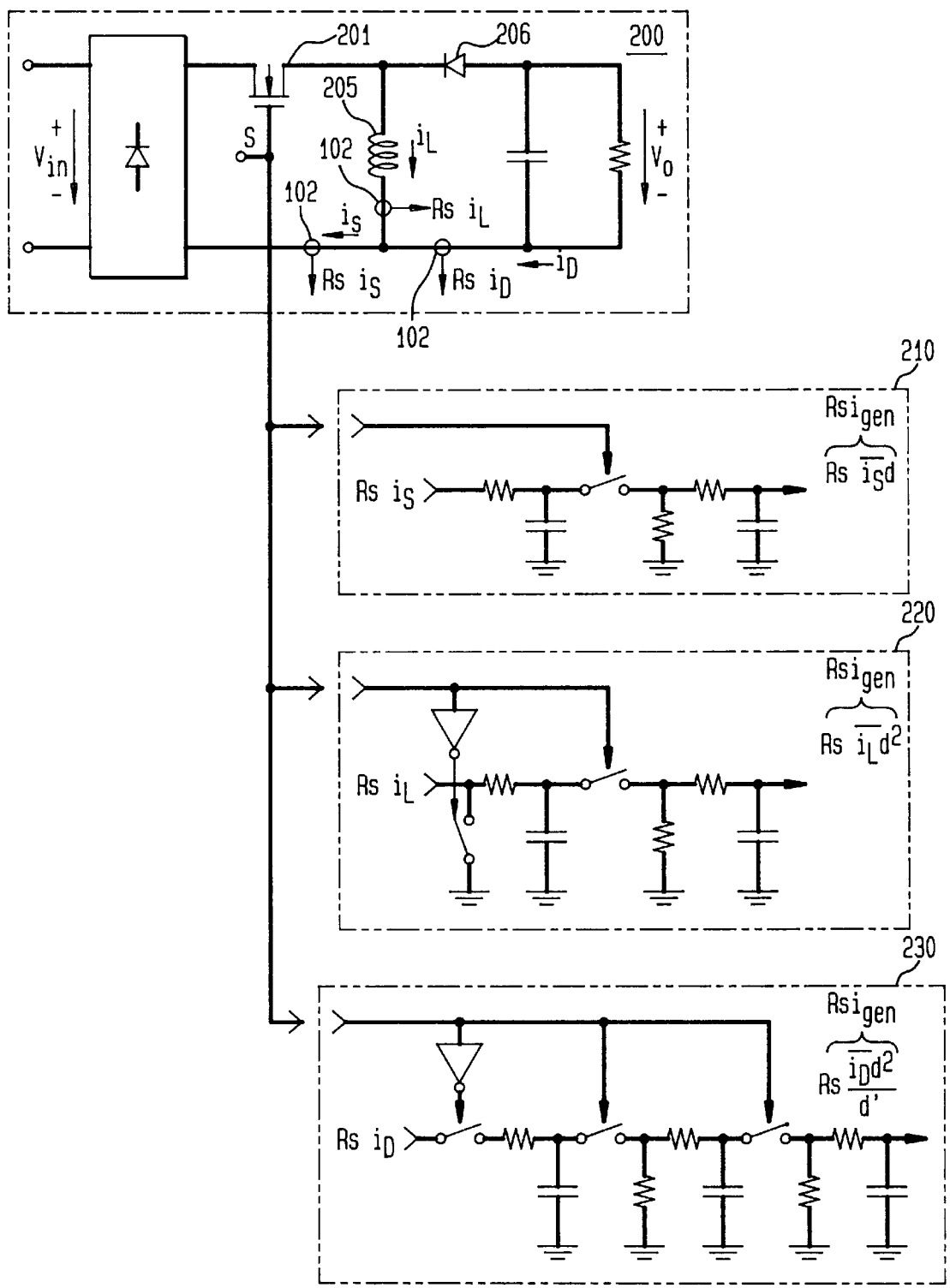
FIG. 2 illustrates exemplary circuits for producing "generalized" currents with a buck-boost converter.

Similarly, FIG. 2 illustrates exemplary circuits 210, 220, 230 for producing a signal $R_s i_{gen}$ that is proportional to a generalized current with a buck-boost converter 200; the signal produced by exemplary circuits 210, 220, and 230 being proportional to the generalized currents defined by equations (13), (12), and (14), respectively. Those skilled in the art will readily perceive of other circuits, functionally equivalent to exemplary circuits 210, 220, and 230, for producing signals proportional to a generalized current $i_{gen}$ with a buck-boost converter 200; the principles of the present invention are not limited to a particular choice of alternative circuits 210, 220, 230, or a specific circuit topology for producing a signal proportional to a generalized current. Likewise, those skilled in the art will recognize that the implementations for flyback, sepic, Cuk, and zeta rectifiers are similar to those for the buck-boost rectifier, and, thus, are not specifically described herein.

Figure 3A:
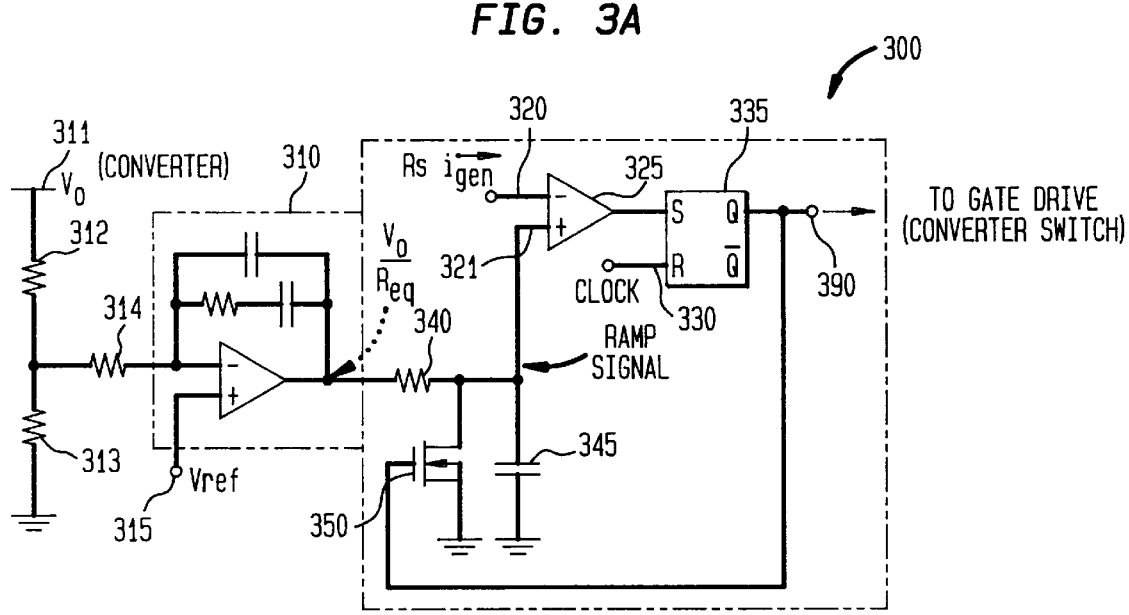
FIG. 3A illustrates an exemplary embodiment of a universal power-factor-correcting ("PFC") controller employing the principles of the present invention.

To illustrate the principles of the present invention, reference is now made to FIG. 3A, which illustrates an exemplary embodiment of a universal power-factor-correcting ("PFC") controller 300 employing the principles of the present invention. The controller 300 includes an output voltage ($V_o$) error amplifier 310 that is coupled to a voltage reference 315 and the output of a converter (not shown) by resistors 312, 314; the resistor 312 and resistor 313 function as a voltage divider to scale the output voltage ($V_o$) to a desired level for input to the error amplifier 310. Those skilled in the art understand the structure and operation of error amplifiers and, thus, a detailed description of the error amplifier 310 is unnecessary to the disclosure of the present invention, the principles of which are not limited to a particular circuit or method of providing the function of error amplifier 310.

In one embodiment of the present invention, the controller 300 receives a signal $R_s i_{gen}$, which is a "generalized" current signal as described hereinabove, at a first input 320 of a comparator 325. The output of comparator 325 is coupled to the "S" input of an RS flip-flop 335, and the "R" input of flip-flop 335 is coupled to a clock (not shown) that provides a clock signal at the switching frequency of the converter. A gate drive signal, generated at the output 390 of the flip-flop 335, is coupled to and controls the operation of a converter switch (e.g., switch 101 or switch 201 in FIGS. 1 and 2, respectively). The duty cycle of the converter switch is initiated when an intermediate signal (described hereinafter), received at a second input 321 of comparator 325, exceeds the signal $R_s i_{gen}$; the duty cycle of the converter switch is terminated by the clock signal.

In one embodiment, the intermediate signal is substantially a ramp signal having a positive slope. The ramp signal can be generated by a RC circuit, including resistor 340 and capacitor 345, that receives the output voltage of the error amplifier 310. The output voltage of the error amplifier, which has a value proportional to $V_o/R_{eq}$ due to the feedback mechanism, controls the charging rate of capacitor 345 and thus the slope of the ramp signal. Design equations for calculating a value for capacitor 345 are known to those skilled in the art; for example, reference is made to Hwang, et al., "New Universal Control Methods for Power Factor Correction and DC to DC Converter Applications," IEEE APEC 1997, pp. 59–65, incorporated herein by reference as if reproduced in its entirety.

A switch 350 across capacitor 345 is used to discharge the capacitor 345 to substantially zero volts when the gate drive signal at output 390 of flip-flop 335 is "high." Thus, the ramp signal starts from zero and grows with a controlled positive slope; the accuracy of the slope is not important since it is continually adjusted by the feedback mechanism of the output voltage error amplifier 310. The ramp signal is compared with $R_s i_{gen}$ by comparator 325, the output of which goes high when the ramp signal exceeds $R_s i_{gen}$, thereby setting the gate drive signal, generated at the output 390 of the flip-flop 335, to a "high" value. The clock signal, generated externally to the controller 300, resets the gate drive signal to "low" at the beginning of each switching cycle. Thus, those skilled in the art will recognize that duty cycles having a value near unity are accurately constructed because the ramp signal can be set to substantially zero at the beginning of each switching cycle. Thus, the present invention discloses a PFC controller system and method that is well conditioned and, with the exception of the set point for the converter output voltage, is no longer dependent on precise values for the associated circuit components.

Figure 3B:
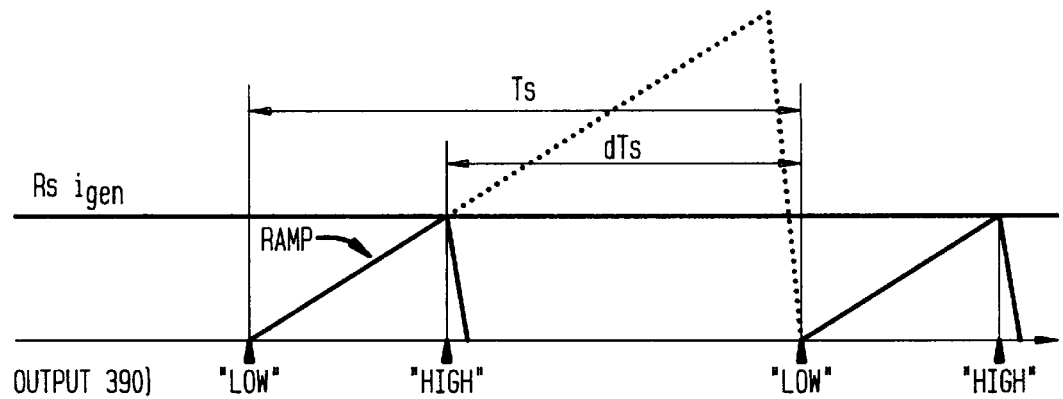
FIG. 3B illustrates exemplary control waveforms for the exemplary universal PFC controller illustrated in FIG. 3A.

Turning now to FIG. 3B, illustrated are exemplary control waveforms for the exemplary universal PFC controller 300 illustrated in FIG. 3A; the control waveforms include a ramp signal and the signal $R_s i_{gen}$, as described hereinabove, illustrated over a switching cycle having a duration $T_s$. As can be seen in FIG. 3B, when switch 350 is turned on (i.e., when output 390 is "high"), the value of the ramp signal goes to substantially zero; when switch 350 is turned off (i.e., when output 390 is "low"), the ramp signal begins to rise. In one embodiment, the slope of the ramp signal is:

$$ramp\_slope = \frac{P_{in} \cdot V_o}{T_s \cdot V_{in}^2}[A/\sec] \qquad (15)$$

In practice, the ramp slope defined by equation (15) must be scaled, considering the maximum power, voltage, etc., to the actual operating voltage range for the operational amplifiers and comparators employed; and, for compatibility, the same scale factor is preferably used to scale the signal $R_s i_{gen}$. As described above, when the value of the ramp signal is equal to $R_s i_{gen}$, the output 390 goes "high," thereby turning on switch 350 and resetting the ramp signal to substantially zero; the ramp signal begins to rise when the clock signal causes the flip-flop 335 to reset the gate drive signal to "low" at the beginning of each switching cycle.

Figure 4A:
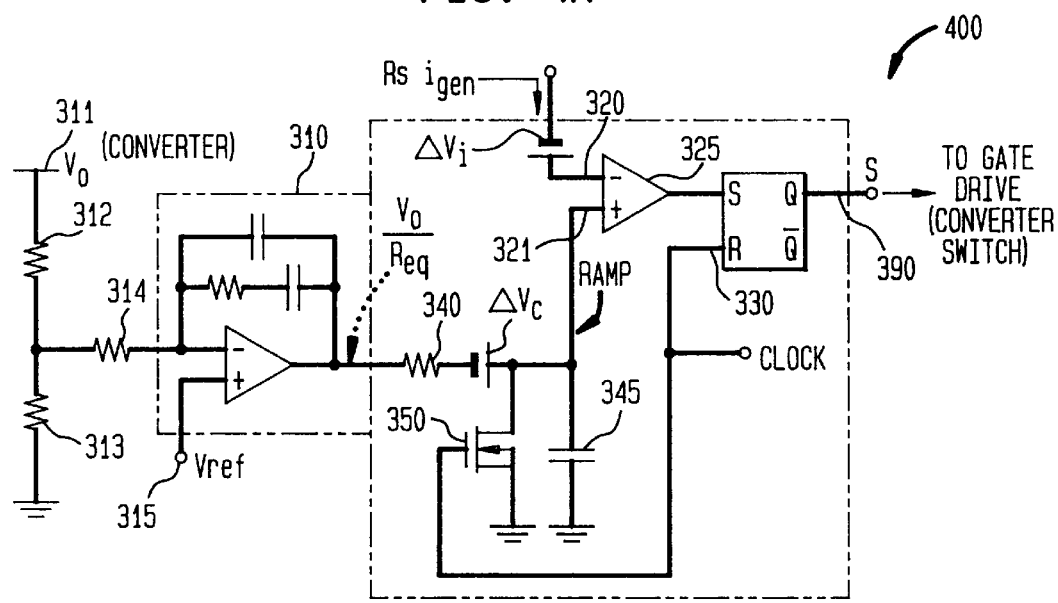
FIG. 4A illustrates an exemplary embodiment of a universal PFC controller employing the principles of the present invention.

The controller scheme illustrated in FIG. 3A works satisfactorily when the power requirement is high, which results in a steep ramp slope. To achieve high performance control with a light load and DCM operation, however, an improved controller scheme as illustrated in FIG. 4A is preferably used. The modifications to the controller scheme, illustrated in FIG. 4A, include:

1). A bias voltage $\Delta v_i$ is added to the $R_s i_{gen}$ signal; because the $R_s i_{gen}$ signal is proportional to either the boost inductor 105 current ($i_L$), the switch 101 current ($i_S$), or the diode 106 current ($i_D$), and the bias voltage $\Delta v_i$ is added thereto, then a circuit for providing the bias voltage $\Delta v_i$ can be considered a current bias circuit. The resulting signal $R_s i_{gen}+\Delta v_i$ increases the minimum slope of the ramp signal which could turn on the converter switch (e.g., switch 101 or 201). Therefore, as those skilled in the art will recognize, the control scheme is substantially less sensitive to circuit noise and is more reliable under light load conditions. Furthermore, the increased minimum slope of the ramp signal also limits the modulator gain, in the small-signal sense, which is the reciprocal of the ramp slope. The limited modulator small-signal gain facilitates the voltage compensator design, and reduces, or eliminates, the sub-harmonic oscillation of input current at light load, which may be present in systems with the scheme illustrated in FIG. 3A because the modulator small-signal gain approaches infinity at very light load due to the substantially flat ramp slope. More importantly, in very light load DCM operations, the $R_s i_{gen}+\Delta v_i$ signal is dominated by the bias voltage $\Delta v_i$, which does not change substantially over an AC (60 Hz) line cycle; therefore, because the ramp slope does not change substantially in the steady state, the rectifier will be operated with a near-constant duty cycle, and will thus achieve a high power factor and low current distortion under light load conditions. A properly selected bias voltage $\Delta v_i$, which can be treated as a broadband disturbance, also helps reduce the dominating harmonic (usually the 3rd order) current at higher load, making the PFC converter more capable of meeting harmonic current regulations. Selecting the bias voltage $\Delta v_i$ too high, however, will result in more cross-over distortion to the input current. Typically, the magnitude of the bias voltage $\Delta v_i$ can be set to approximately 10% of the peak value of $R_s i_{gen}$. Those skilled in the art will recognize that the bias voltage $\Delta v_i$ can be implemented as a resistor coupled to a known voltage source, or by using the junction voltage of a diode; the principles of the present invention are not limited to a particular means of providing the bias voltage $\Delta v_i$.

2). Optionally, a bias voltage $\Delta v_c$ is added to the voltage error amplifier output. Although the feedback control of the output voltage should adjust the output of the voltage error amplifier after the addition of the bias voltage $\Delta v_i$, the addition of bias voltage $\Delta v_i$ can add a deadband to the control in transients because a small output voltage of the error amplifier cannot affect the rectifier operation. The deadband can reduce the response speed or cause severe oscillation in the rectifier during load transients at light load. The bias voltage $\Delta v_c$ can compensate for the deadband created by the addition of bias voltage $\Delta v_i$ to the $R_s i_{gen}$ signal. The value of $\Delta v_c$ is preferably adjusted such that, if the output of the error amplifier 310 is at its minimum, the magnitude of the ramp signal at the end of each switching cycle is slightly lower than $\Delta v_i$. In this way, the converter 400 is still able to operate at zero duty cycle, but the error amplifier 310 only sees a minimum deadband, and the rectifier control is still smooth at light load.

3). The clock signal, instead of the output 390 of the flip-flop 335, is used as the reset signal to switch 350, thereby ensuring that the ramp signal will be reset every switching cycle.

In alternative embodiments, the bias voltages $\Delta v_c$ and $\Delta v_i$ can be constant or variable, or can be made to change with the input voltage or the switch duty cycle. With the foregoing modifications to the controller illustrated in FIG. 3A, the controller shown in FIG. 4A achieves high performance at all load conditions, and can be used as a universal PFC controller for a wide range of PFC applications.

Figure 4B:
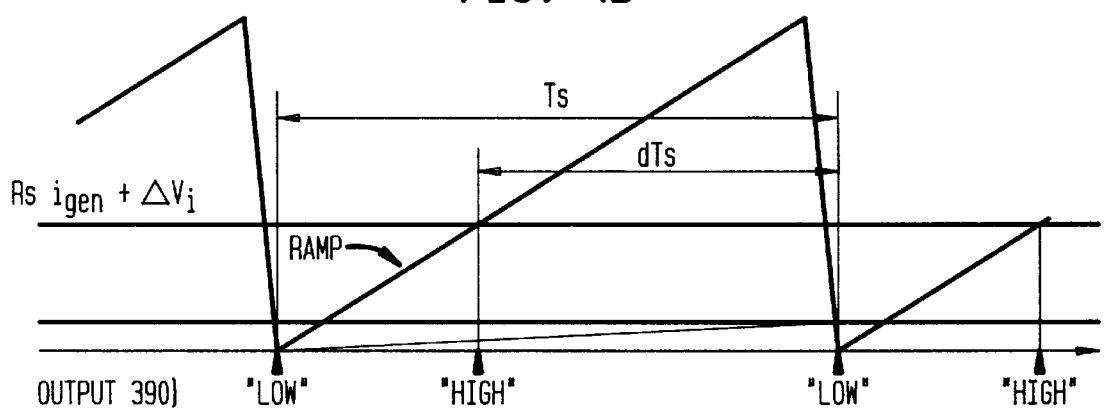
FIG. 4B illustrates exemplary control waveforms for the exemplary universal PFC controller illustrated in FIG. 4A.

Referring to FIG. 4B, illustrated are exemplary control waveforms for the exemplary universal PFC controller illustrated in FIG. 4A; the control waveforms include a ramp signal and a signal $R_s i_{gen}+\Delta v_i$, as described hereinabove, illustrated over a switching cycle having a duration $T_s$. As can be seen in FIG. 4B, when switch 350 is turned on (i.e., when output 390 is "high"), the ramp signal does not go to substantially zero, as in controller 300; the ramp signal is reset to zero only at the beginning of each switching cycle (i.e., when the clock signal goes "high"). When the value of the ramp signal is equal to $R_s i_{gen}+\Delta v_i$, however, the output 390 will still go "high," causing the converter switch (e.g., switch 101 or 201) to turn on.

Figure 5:
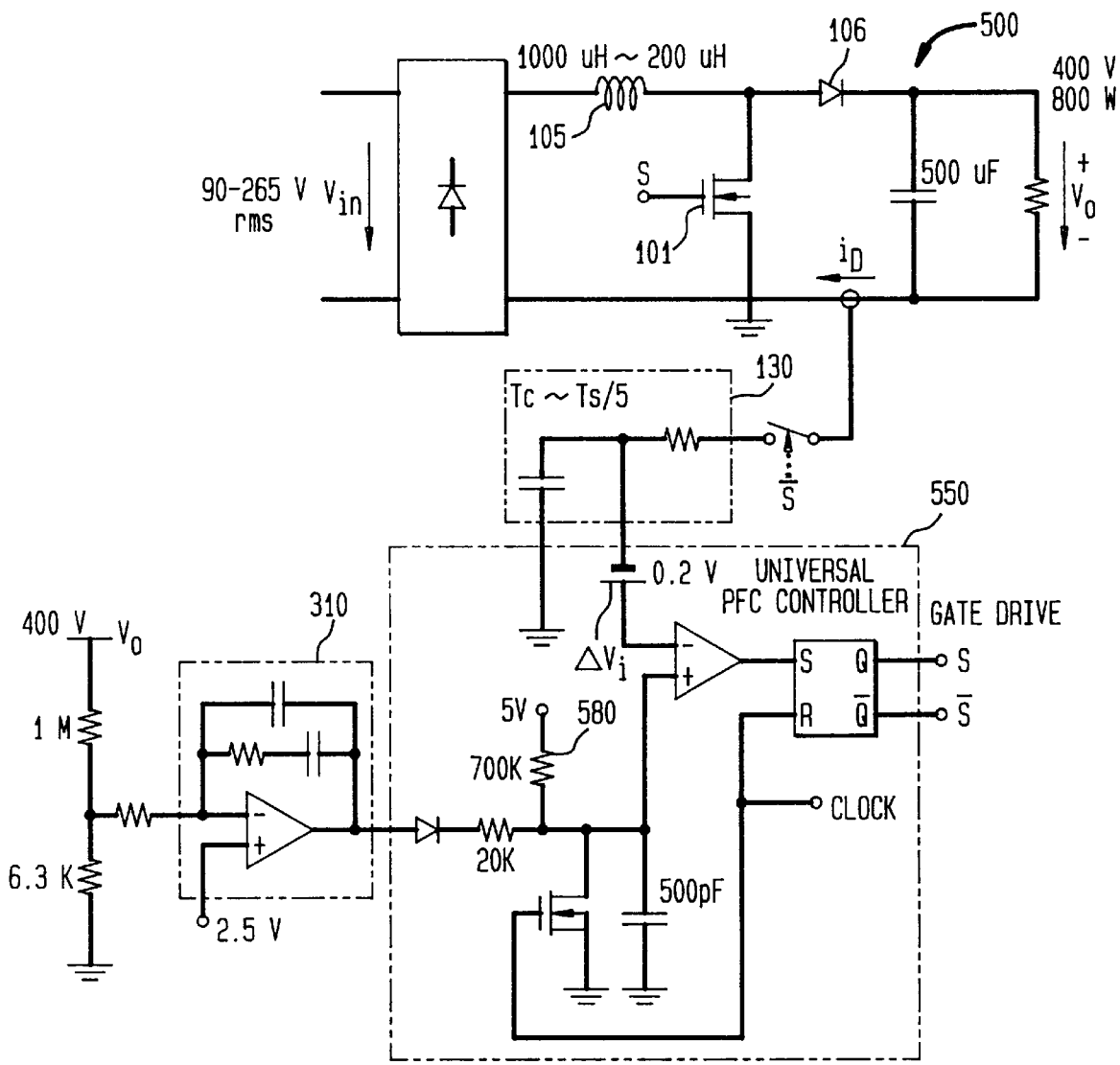
FIG. 5 illustrates an exemplary boost converter employing an exemplary universal PFC controller according to the principles of the present invention.

Turning now to FIG. 5, illustrated is an exemplary boost converter 500 employing an exemplary universal PFC controller 550, with exemplary circuit 130 used to provide the $R_s i_{gen}$ signal. The topology of exemplary universal PFC controller 550 is identical to controller 400 illustrated in FIG. 4A, wherein bias voltage $\Delta v_i$ is equal to 0.2 volts and $\Delta v_c$ is implemented as a resistor 580 coupled to a 5 volt source.

Figure 6A:
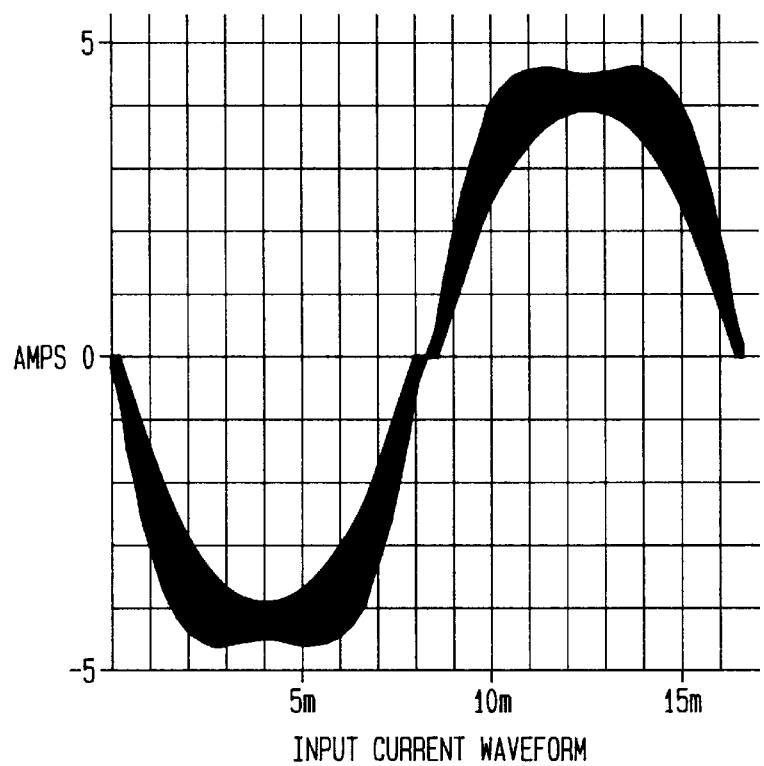
FIG. 6A illustrates a simulated input current waveform for the exemplary boost converter illustrated in FIG. 5 when operating at 260 V(rms) input voltage and 800 W output power.
Figure 6B:
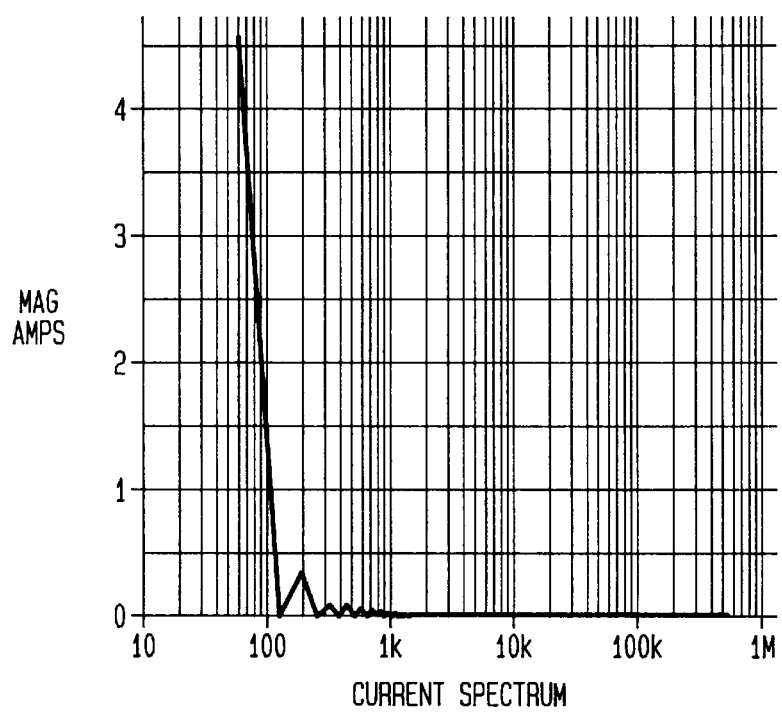
FIG. 6B illustrates a simulated input current spectrum for the exemplary boost converter illustrated in FIG. 5 when operating at 260 V(rms) input voltage and 800 W output power.
Figure 7A:
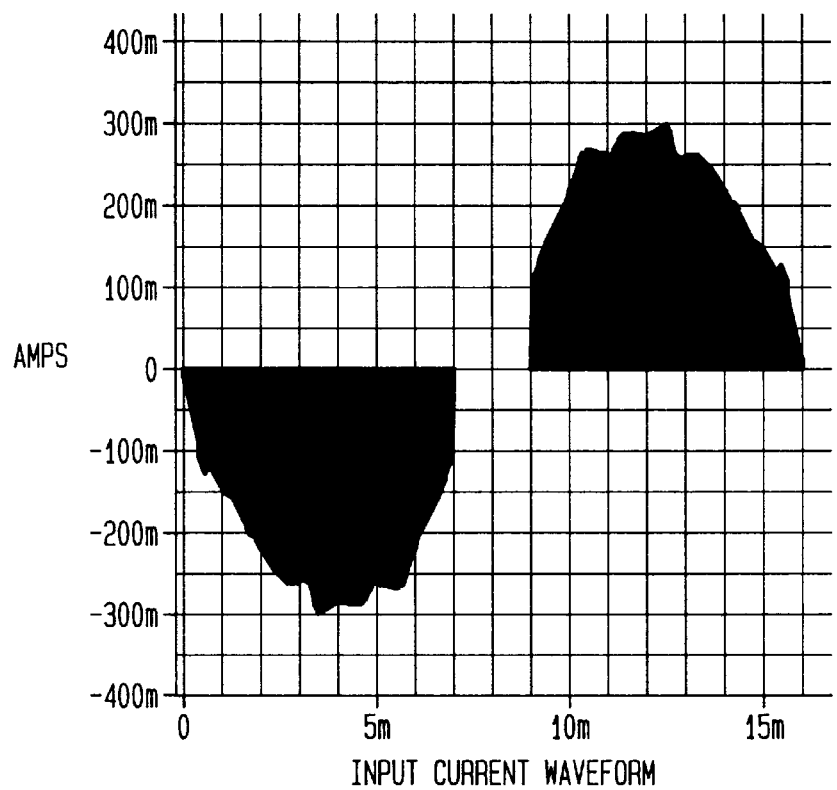
FIG. 7A illustrates a simulated input current waveform for the exemplary boost converter illustrated in FIG. 5 when operating at 260 V(rms) input voltage and 8 W output power.
Figure 7B:
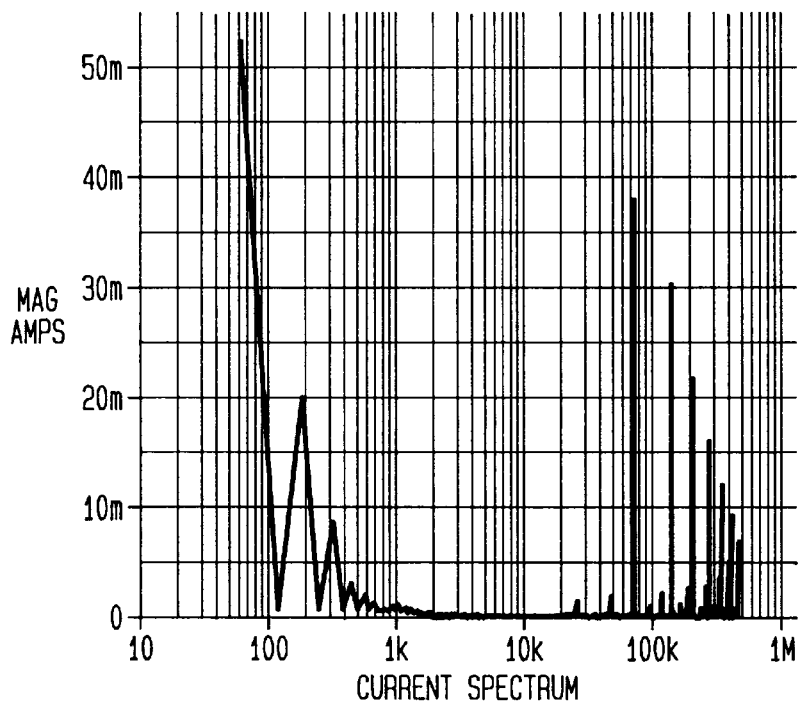
FIG. 7B illustrates a simulated input current spectrum for the exemplary boost converter illustrated in FIG. 5 when operating at 260 V(rms) input voltage and 8 W output power.
Figure 8A:
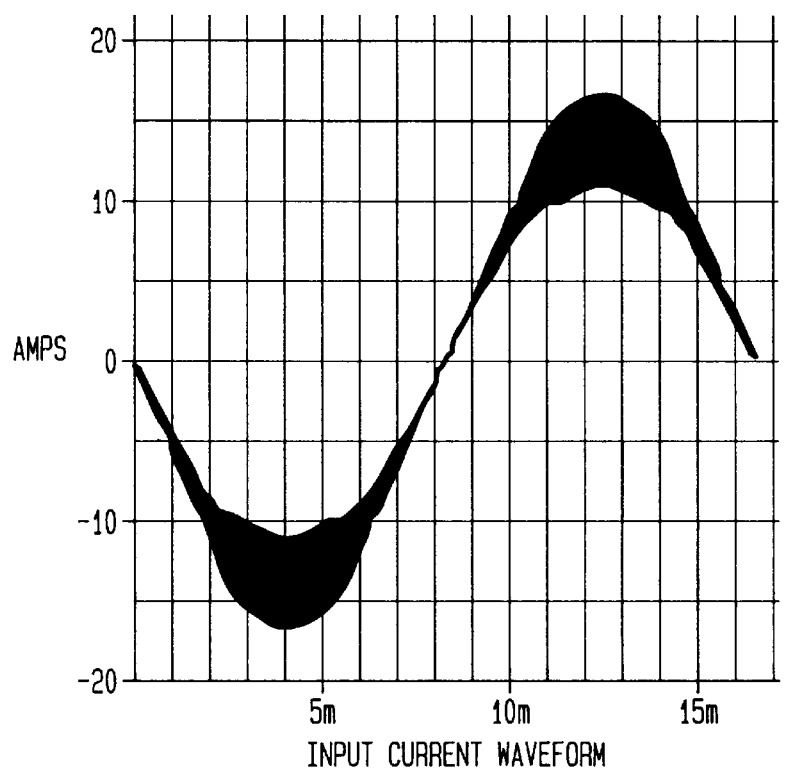
FIG. 8A illustrates a simulated input current waveform for the exemplary boost converter illustrated in FIG. 5 when operating at 90 V(rms) input voltage and 800 W output power.
Figure 8B:
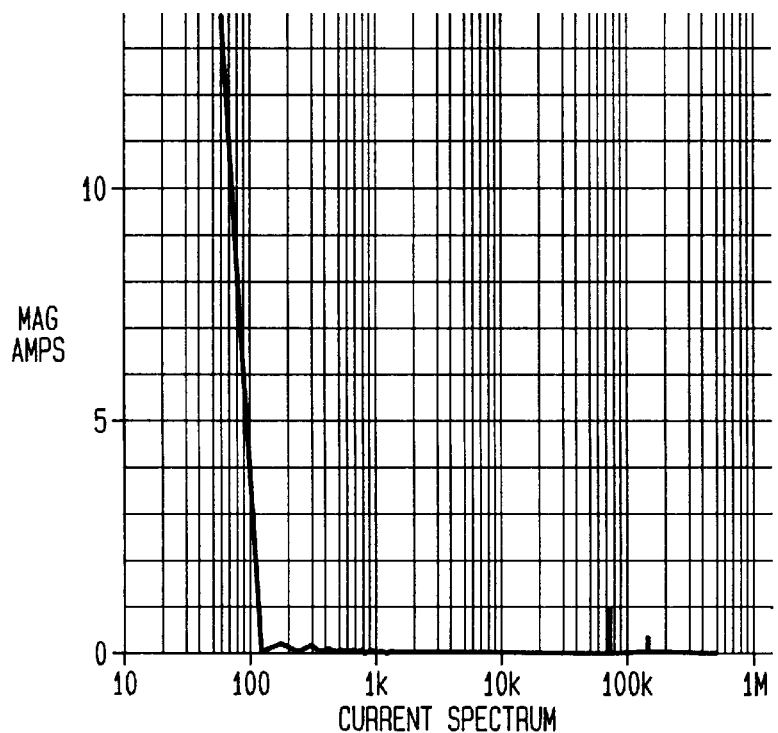
FIG. 8B illustrates a simulated input current spectrum for the exemplary boost converter illustrated in FIG. 5 when operating at 90 V(rms) input voltage and 800 W output power.
Figure 9A:
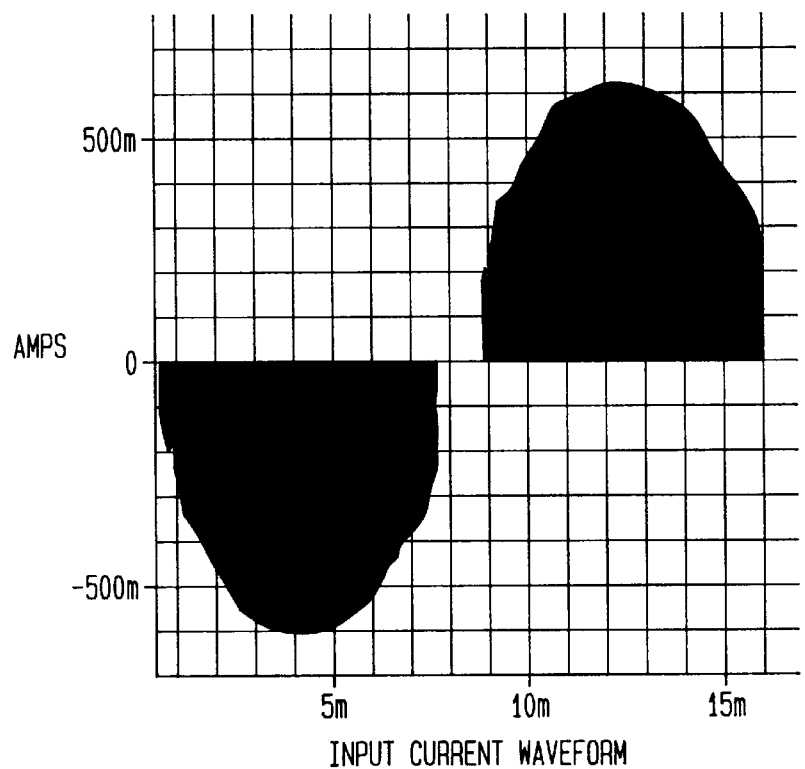
FIG. 9A illustrates a simulated input current waveform for the exemplary boost converter illustrated in FIG. 5 when operating at 90 V(rms) input voltage and 8 W output power.
Figure 9B:
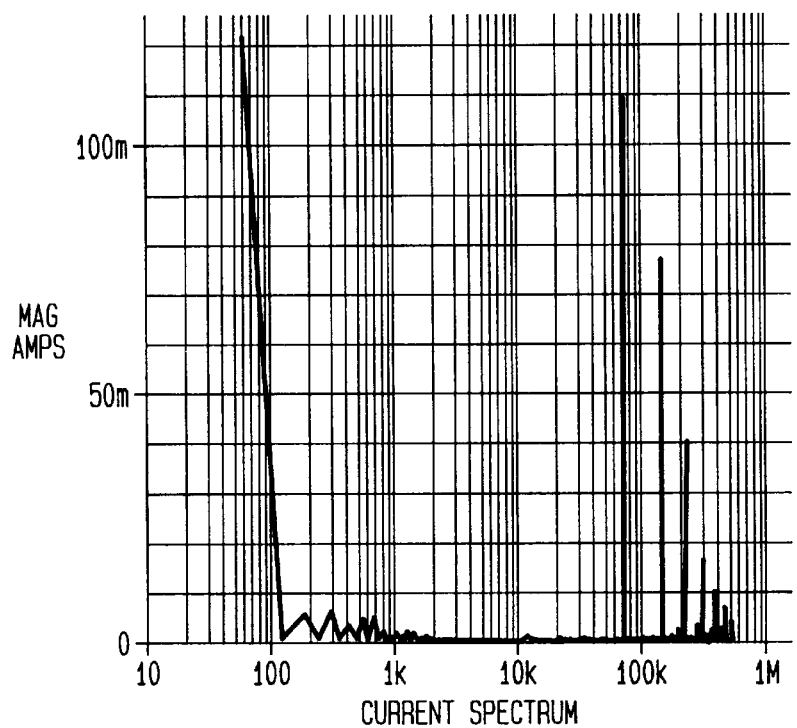
FIG. 9B illustrates a simulated input current spectrum for the exemplary boost converter illustrated in FIG. 5 when operating at 90 V(rms) input voltage and 8 W output power.

Extensive simulation has been conducted to verify the operational principle and performance of the proposed schemes in steady-state conditions. FIGS. 6A and 6B through 9A and 9B illustrate the input current waveforms and the spectra for a boost rectifier, employing the principles of the present invention, under different operating conditions; FIG. 6A illustrates a simulated input current waveform, and FIG. 6B illustrates a simulated input current spectrum, for the exemplary boost converter illustrated in FIG. 5 when operated at 260 V(rms) input voltage and 800 W output power; FIG. 7A illustrates a simulated input current waveform, and FIG. 7B illustrates a simulated input current spectrum, for the exemplary boost converter illustrated in FIG. 5 when operated at 260 V(rms) input voltage and 8 W output power; FIG. 8A illustrates a simulated input current waveform, and FIG. 8B illustrates a simulated input current spectrum, for the exemplary boost converter illustrated in FIG. 5 when operated at 90 V(rms) input voltage and 800 W output power; and FIG. 9A illustrates a simulated input current waveform, and FIG. 9B illustrates a simulated input current spectrum, for the exemplary boost converter illustrated in FIG. 5 when operated at 90 V(rms) input voltage and 8 W output power. As illustrated by these simulation results, input current waveforms with low THD may be achieved under a wide range of line and load conditions.

Figure 10A:
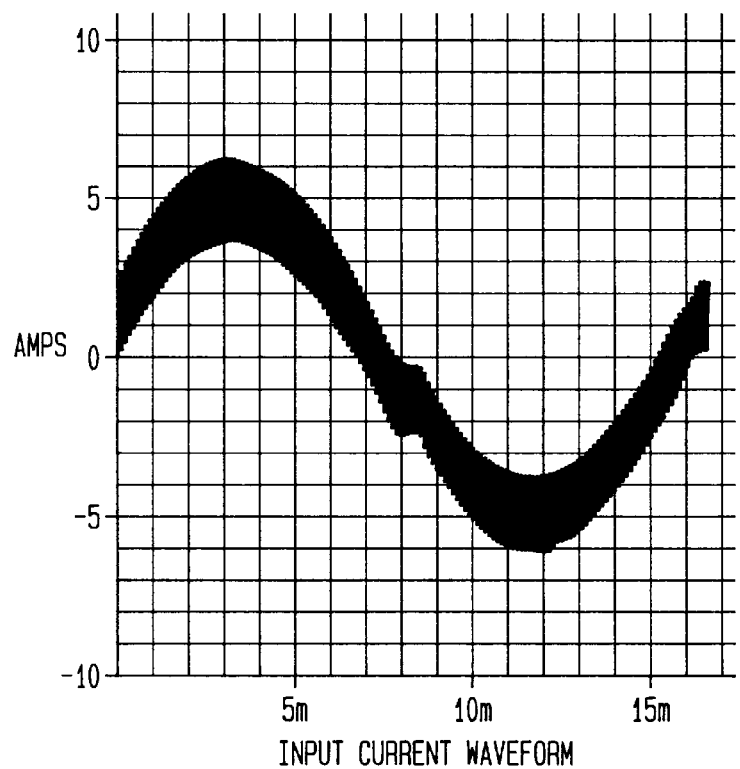
FIG. 10A illustrates a simulated input current waveform for a buck-boost converter when operating at 260 V(rms) input voltage and 800 W output power.
Figure 10B:
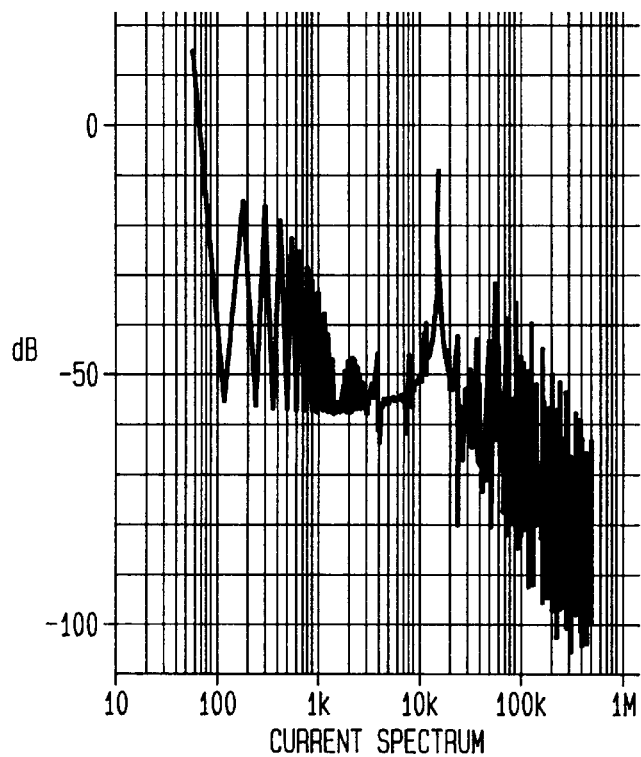
FIG. 10B illustrates an input current spectrum for the simulated input current waveform illustrated in FIG. 10A.
Figure 11A:
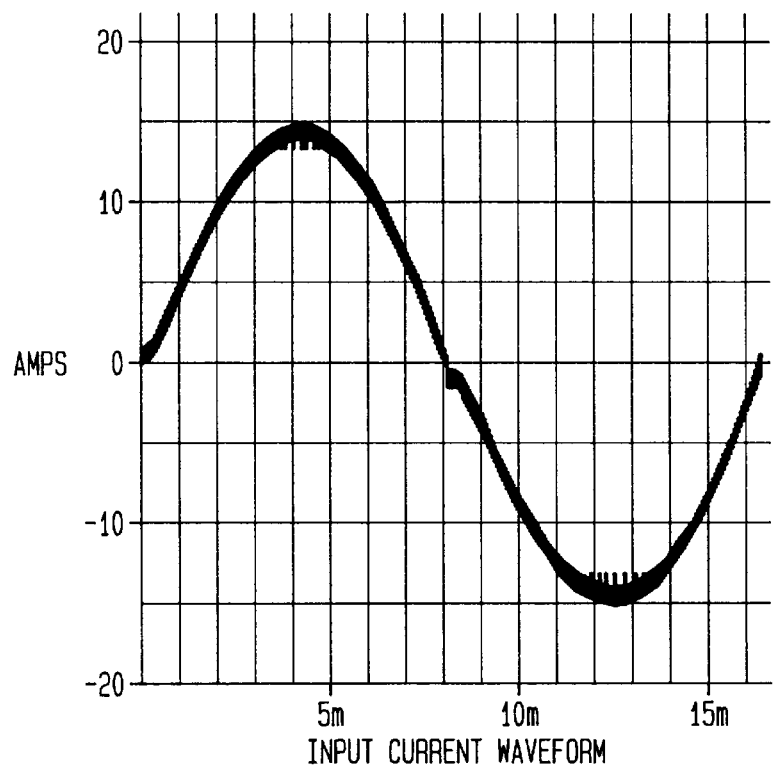
FIG. 11A illustrates a simulated input current waveform for a buck-boost converter when operating at 90 V(rms) input voltage and 800 W output power.
Figure 11B:
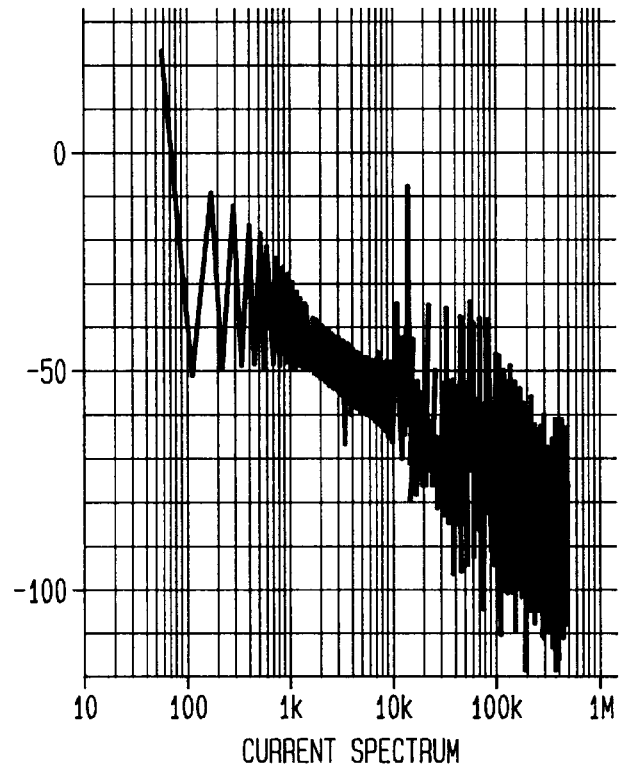
FIG. 11B illustrates an input current spectrum for the simulated input current waveform illustrated in FIG. 11A.

The operations of buck-boost type rectifiers, including flyback, sepic, Cuk, and zeta rectifiers, are all similar. To verify the proposed PFC schemes using a universal PFC controller employing the principles of the present invention, a buck-boost rectifier having the same operating parameters as the boost rectifier illustrated in FIG. 5, and using exemplary circuit 210 to provide the $R_s i_{gen}$ signal, was simulated. A LC filter of 10 uH and 10 uF was included at the input to provide a smooth input current. FIG. 10A illustrates a simulated input current waveform, and FIG. 10B illustrates a simulated input current spectrum, for the simulated buck-boost rectifier when operated at 260 V(rms) input voltage and 800 W output power; and FIG. 11A illustrates a simulated input current waveform, and FIG. 11B illustrates an input current spectrum, for the simulated buck-boost rectifier when operated at 90 V(rms) input voltage and 800 W output power. Those skilled in the art will recognize that the THD of the input current in both low line and high line conditions is very small, thereby illustrating that the principles disclosed herein may be used to advantage in buck-boost and similar types of rectifiers.

Thus, those skilled in the art will recognize that the present invention discloses a universal PFC controller that allows well-conditioned high power factor control for all principal PFC topologies. The universal PFC controller avoids the need for input voltage sensing, a dedicated current compensator, and the multiply-and-divide operation found in conventional control approaches. The universal PFC controller accommodates both DCM operation at light load and CCM operation at heavy load, and works well over a wide range of AC input voltages. A further advantage of the universal design of the present invention is a reduction in the manufacturing cost of rectifiers employing conventional controllers.

Although the present invention and its advantages have been described in detail, those skilled in the art should understand that they can make various changes, substitutions and alterations herein without departing from the spirit and scope of the invention in its broadest form.

What is claimed is:

1. A power factor controller, comprising:

a ramp circuit that senses an output voltage of a converter being controlled and generates an intermediate waveform that rises as a function of a magnitude of said output voltage;

a bias circuit, coupled to said ramp circuit, that establishes a value substantially greater than zero for, and adjusts a rate of rise of, said intermediate waveform; and a drive circuit, coupled to said ramp circuit, that senses a current in said converter and causes said intermediate waveform to fall at a time that is a function of a magnitude of said current, said drive circuit generating a drive signal for said converter from said intermediate waveform.

2. The controller as recited in claim 1 wherein said ramp circuit comprises an error amplifier that compares said output voltage with a voltage reference.

3. The controller as recited in claim 1 wherein said drive circuit comprises:

a clock;

a flip-flop coupled to said clock that generates said drive signal; and a controllable switch coupled to said ramp circuit that causes said intermediate waveform to fall.

4. The controller as recited in claim 1 wherein said current represents one of the group consisting of:

converter inductor current, converter switch current, and converter diode current.

5. The controller as recited in claim 1 wherein said bias circuit is a voltage bias circuit.

6. The controller as recited in claim 1 wherein said drive circuit comprises a current bias circuit that adjusts an occurrence of said time.

7. The controller as recited in claim 1 wherein said drive circuit employs said drive signal to cause said intermediate waveform to fall.

8. A method of controlling power factor, comprising the steps of:

generating an intermediate waveform that rises as a function of a magnitude of an output voltage of a converter being controlled;

causing said intermediate waveform to fall at a time that is a function of a magnitude of a current in said converter;

establishing a substantially greater than zero value for said intermediate waveform;

adjusting a rate of rise of said intermediate waveform; and generating a drive signal for said converter from said intermediate waveform.

9. The method as recited in claim 8 wherein said step of generating comprises the step of comparing said output voltage with a voltage reference.

10. The method as recited in claim 8 wherein said step of causing comprises the steps of:

generating a clock signal;

driving a flip-flop with said clock signal; and driving a controllable switch coupled to said flip flop to cause said intermediate waveform to fall.

11. The method as recited in claim 8 wherein said current represents one of the group consisting of:

converter inductor current, converter switch current, and converter diode current.

12. The method as recited in claim 8 wherein the step of adjusting is performed by a bias circuit.

13. The method as recited in claim 8 further comprising the step of adjusting an occurrence of said time.

14. The method as recited in claim 8 wherein said step of causing comprises the step of employing said drive signal to cause said intermediate waveform to fall.

15. An AC-DC power converter, comprising:

a power train, including:

a controllable switch, an inductive element coupled to said controllable switch, and a capacitive element coupled to said inductive element, said controllable switch, inductive element and capacitive element cooperating to convert AC input power to DC output power; and a power factor controller that controls an operation of said controllable switch, including:

a ramp circuit that senses a voltage of said DC output power and generates an intermediate waveform that rises as a function of a magnitude of said voltage, a bias circuit, coupled to said ramp circuit, that establishes a value substantially greater than zero for, and adjusts a rate of rise of, said intermediate waveform; and a drive circuit, coupled to said ramp circuit, that senses a current in said power train and causes said intermediate waveform to fall at a time that is a function of a magnitude of said current, said drive circuit generating a drive signal for said controllable switch from said intermediate waveform.

16. The converter as recited in claim 15 wherein said ramp circuit comprises an error amplifier that compares said output voltage with a voltage reference.

17. The converter as recited in claim 15 wherein said drive circuit comprises:

a clock;

a flip-flop coupled to said clock that generates said drive signal; and a drive circuit controllable switch coupled to said ramp circuit that causes said intermediate waveform to fall.

18. The converter as recited in claim 15 wherein said current represents one of the group consisting of:

converter inductor current, converter switch current, and converter diode current.

19. The converter as recited in claim 15 wherein said bias circuit is a voltage bias circuit.

20. The converter as recited in claim 15 wherein said drive circuit comprises a current bias circuit that adjusts an occurrence of said time.

21. The converter as recited in claim 15 wherein said drive circuit employs said drive signal to cause said intermediate waveform to fall.

22. The converter as recited in claim 21 wherein said converter is selected from the group consisting of:

a boost converter, a buck-boost converter, a flyback converter, a sepic converter, a Cuk converter, and a zeta converter.

* * * * *